US008195773B2

(12) United States Patent
Congdon et al.

(10) Patent No.: US 8,195,773 B2
(45) Date of Patent: Jun. 5, 2012

(54) N-TIER CONFIGURED IMAP SERVER

(75) Inventors: Robert M. Congdon, Arlington, MA (US); Wei-Lee H. Jamrog, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 1680 days.

(21) Appl. No.: 10/678,400

(22) Filed: Oct. 3, 2003

(65) Prior Publication Data

US 2005/0076083 A1  Apr. 7, 2005

(51) Int. Cl.
*G06F 15/177* (2006.01)
(52) U.S. Cl. ........................................ 709/220; 709/206
(58) Field of Classification Search .................. 709/203, 709/206, 223–225, 220
See application file for complete search history.

(56) References Cited

U.S. PATENT DOCUMENTS

| | | | |
|---|---|---|---|
| 6,377,944 B1 * | 4/2002 | Busey et al. | 707/3 |
| 6,947,943 B2 * | 9/2005 | DeAnna et al. | 707/100 |
| 6,981,041 B2 * | 12/2005 | Araujo et al. | 709/224 |
| 6,985,944 B2 * | 1/2006 | Aggarwal | 709/224 |
| 6,988,138 B1 * | 1/2006 | Alcorn et al. | 709/225 |

OTHER PUBLICATIONS

Hall, Tara, The Lotus Workplace Preview with Jeff Calow, *LDD Today*, Lotus Software, Aug. 4, 2003, pp. 1-6.
Anonymous Author, *Lotus Workplace—An Innovative Platform for Integrating People with Business* (visited Sep. 29, 2003) <http://www.lotus.com/engine/jumpages.nsf/wdocs/ondemand>.
Harer, Michael, et al., A Cost-Effective Way to Extend the Reach of Messaging, *Messaging Solutions White Paper*, Lotus Software, Jun. 2003, pp. 1-30.
Anonymous Author, Help Users Work More Productively With Targeted Messaging Solutions, *Lotus Messaging Product Family*, Lotus Software, 2003, pp. 1-8.
Anonymous Author, IBM Lotus Workplace Messaging 1.0, *Provide a Cost-Effective Way to Extend the Reach of Messaging to the rest of your Organization*, Lotus Software, 2003, pp. 1-8.
Anonymous Author, IBM Lotus Workplace Messaging, *Improve Employee Productivity with a Cost-effective Messaging Solution*, Lotus Software, 2003, pp. 1-6.
Crispin, M., *Internet Message Access Protocol—Version 4rev1*, The Internet Society, Mar. 2003, pp. 1-93.
Gould, Steven, Develop n-tier Applications Using J2EE, An Introduction to the Java 2 Platform, Enterprise Edition Specification by Way of BEA's WebLogic Server, *JavaWorld*, Dec. 2003, pp. 1-10.

(Continued)

*Primary Examiner* — Hussein A. Elchanti
(74) *Attorney, Agent, or Firm* — Steven M. Greenberg, Esq.; Carey, Rodriguez, Greenberg & O'Keefe, LLP

(57) ABSTRACT

An n-tier configured Internet Message Access Protocol (IMAP) compliant mail server. A collaborative messaging application can include an IMAP compliant mail server configured for operation within an n-tier enterprise environment provided by an application server. The collaborative messaging application also can include a markup language driven interface to the IMAP compliant mail server disposed within a Web container in the application server. A data store can be configured to store messages process by the IMAP compliant mail server. Finally, a directory can be configured to provide configuration and addressing data to the IMAP compliant mail server. Importantly, the IMAP compliant mail server can include a set of platform independent classes programmed for execution in a virtual machine and specifically operable in the n-tier enterprise environment. In particular, the virtual machine can be a Java virtual machine and the n-tier enterprise environment can include J2EE.

14 Claims, 3 Drawing Sheets

OTHER PUBLICATIONS

Anonymous Author, *Using the JavaMail™ API* (visited Sep. 29, 2003) <http://docs.suncom/source/816-7153-10djmail.html>.

Anonymous Author, *What is IMAP?* (visited Sep. 28, 2003) <http://www.imap.org/about/whatisIMAP.html>.

Guru, J., *Fundamentals of the JavaMail API, Short Course* (visited Sep. 28, 2003) <http://developer.java.sun.com/developer/onlineTraining/JavaMail/contents.html>.

Kangas, Erik, Understanding Email Services: What are they and what do you need? *Lux Scientiae*, Lux Scientiae,Incorporated, 2003, pp. 1-6.

Fontana, John, IMAP4 Closes E-Mail Application Gap, *Internet Week*, May 29, 1998, pp. 1-2.

Tschabitscher, Heinz, What IMAP Can Do for You, *What You Need to Know About Email with Heinz Tschabitscher—Your Guide to one of Hundreds of Sites*, <http://email.about.com/library/weekly/aa52200a.htm>, pp. 1-3.

Kangas, Erik, The Case for Secure Email, *Lux Scientiae*, Lux Scientiae, Incorporated, 2003, pp. 1-9.

Tschabitscher, Heinz, What IMAP Can Do for You, *What You Need to Know About Email with Heinz Tschabitscher—Your Guide to one of Hundreds of Sites*, <http://email.about.com/library/weekly/aa52200b.htm>, pp. 1-3.

\* cited by examiner

N-TIER CONFIGURED IMAP SERVER

BACKGROUND OF THE INVENTION

1. Statement of the Technical Field

The present invention relates to the field of Internet messaging and more particularly to an Internet Message Access Protocol (IMAP) server implementation.

2. Description of the Related Art

Messaging clients and in particular, electronic mail (e-mail) clients include numerous options for managing, manipulating and viewing e-mail. Conventional e-mail clients include a simplified interface designed both to enhance the end-user experience and also to facilitate mail administration while reducing support costs. Through the conventional e-mail client, end-users can configure and store personal preferences, compile bulk mailing lists, archive and back up mail, and even create filters and drop spam into virtual wastebaskets. By providing end users with feature-rich e-mail clients, administrators can relieve themselves of many duties traditionally given to the "postmaster."

Modern e-mail clients predominantly include but two "flavors": clients which comport to the Post Office Protocol (POP), and clients which implement the Internet Message Access Protocol (IMAP). Both POP and IMAP compliant e-mail clients can access e-mail in online, offline and disconnected modes In an offline mode, e-mail can be received and stored on a shared server and forwarded on demand to a mail client on a remote computer. Notably, the POP protocol originally had been designed for use in an offline mode. In this regard, once an e-mail has been downloaded, or "POPped," it can be removed from the mail server, and all future processing in respect to the e-mail can occur within the machine hosting the e-mail client.

Given its simplicity, the POP protocol has won the hearts and minds of many a road warrior, yet for truly unlimited access to one's e-mail, the POP protocol can be deficient and the IMAP protocol will be required. In the IMAP protocol as defined by RFC 3501, e-mail clients access e-mail folders online and manipulate them on a remote server as if the e-mail folders were a local resource. Users can create, delete and rename message folders, or "mailboxes," check for new messages and permanently remove messages. IMAP, like POP, provides for RFC 822 and MIME parsing and searching, and it adds support for selective download of message attributes, text and attachments. IMAP also works in disconnected mode (IMAP-DISC), in which a mail client downloads a set of messages from the server, manipulates them offline, then reconnects to the server and synchronizes changes. Nevertheless, unlike POP, in all cases in IMAP the e-mail server remains the authoritative message store.

It will be recognized by the skilled artisan that e-mail clients, whether POP or IMAP compliant, no longer can be viewed exclusively as ordinary desktop applications. Rather, e-mail clients must be viewed as part and parcel of a business-critical messaging system. Consequently, twenty-first century e-mail clients are embodied within a full thirty-two bit application which can provide quick and easy access to incoming e-mail, myriad features available from pull-down menus, and extensive right-click context menus that provide multiple options on selected resources. Drag-and-drop functionality and keyboard shortcuts are also common. Moreover, the modern, stand-alone e-mail client can provide extensive message-filtering capabilities to manipulate e-mail automatically and reply to messages with auto-responses. Built-in e-mail client features also allow the end-users to create and send bulk e-mail from precompiled lists stored in text files and provide options for dealing with unsolicited bulk e-mail known commonly as "spam".

Despite the advancement of the e-mail client, recent trends in computing require the further development of the e-mail client and its integration into the n-tier enterprise. In particular, enterprise computing has begun to embrace the notion of collaboration between multiple users resulting in the rise of collaborative software. In the collaborative software environment, multiple users are grouped together logically in an environment in which documents can be shared and manipulated by the users, users can participate in online conferences and in instant messaging, and users can experience computer based training, or "e-Learning". Thus, messaging can form an important portion of the foundation of collaborative computing.

To date, less than a handful of collaborative computing applications have incorporated IMAP based messaging within the structure of the collaborative computing application. In particular, while IMAP configured e-mail clients have become prevalent, a IMAP configured servers seldom have been included as part and parcel of the collaborative computing application. In those circumstances where a collaborative application has been configured with an IMAP server, the IMAP server literally has been "bolted" onto the collaborative application in a client-server manner and lacks the scalability required by the modern enterprise architecture including the J2EE™ based enterprise environment. Accordingly, traditional collaborative computing applications have not been able to capitalize upon the advantages of IMAP while retaining the scalability associated with the n-tier architecture of J2EE.

SUMMARY OF THE INVENTION

The present invention addresses the deficiencies of the art in respect to enterprise messaging in the collaborative computing and provides a novel and non-obvious IMAP server configured for n-tier integration with a collaborative computing platform. In accordance with the present invention, an IMAP server can be composed as a collection of platform independent classes which can be executed within a virtual machine. The IMAP server can be programmed for integration with a collaborative application configured for operation within an application server. Additionally, the IMAP server can be communicatively coupled to a data store of messages and can respond to IMAP requests to manage messages in the data store. Importantly, the IMAP server can interact with the application server to authenticate IMAP clients. Moreover, the IMAP server can interact with the collaborative application to implement auto-provisioning of the IMAP server.

Notably, the architecture of the collaborative application can mimic that of the application server. To that end, the collaborative application can include a set of mail-server cells, each cell servicing a data store of messages. In the collaborative messaging system, a mail server cell can include a logical grouping of application server nodes disposed within the application server. An IMAP compliant mail server can be coupled to the logical grouping of application server nodes. Finally, at least one data store can be configured for storing electronic mail messages processed in the IMAP compliant mail server.

The IMAP compliant mail server can include a simple mail transfer protocol (SMTP) inbound request handler, an SMTP outbound request handler, and a set of IMAP services coupled to the SMTP inbound and outbound request handlers. The IMAP compliant mail server also can include a set of platform independent classes operable in a virtual machine environment. In this regard, the virtual machine environment can be the Java virtual machine environment and the IMAP compliant mail server can comport with the J2EE specification.

In a preferred aspect of the invention, the IMAP compliant mail server can include a communicative coupling to authentication services provided through the application server. Also, the IMAP compliant mail server can include a communicative coupling to auto-provisioning services provided through the collaborative application. In this way, a new user can access the IMAP compliant mail server without first having pre-registered with the IMAP compliant mail server. Finally, the IMAP compliant mail server can include a communicative coupling to a portal/portlet interface to the IMAP compliant mail server.

The IMAP compliant mail server can be disposed within a collaborative messaging application. Specifically, the collaborative messaging application can include an IMAP compliant mail server configured for operation within an n-tier enterprise environment provided by an application server. The collaborative messaging application also can include a markup language driven interface to the IMAP compliant mail server disposed within a Web container in the application server. A data store can be configured to store messages process by the IMAP compliant mail server. Finally, a directory can be configured to provide configuration and addressing data to the IMAP compliant mail server.

Importantly, the IMAP compliant mail server can include a set of platform independent classes programmed for execution in a virtual machine and specifically operable in the n-tier enterprise environment. In particular, the virtual machine can be a Java virtual machine and the n-tier enterprise environment can include J2EE. An administrative console can be coupled to a messaging administrative plug-in to the console facilitate management of the IMAP compliant mail server, the markup language driven interface, the data store and the directory. Moreover, authentication logic can be disposed within the application server and communicatively linked to the IMAP compliant mail server for use by the IMAP compliant mail server. Finally, auto-provisioning logic can be disposed within the collaborative messaging application and communicatively linked to the IMAP compliant mail server for use by the IMAP compliant mail server.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is an IMAP server which has been programmed for integration with a collaborative messaging application within an application server. The IMAP server can include a platform independent collection of classes and can be configured to operate within a virtual machine. To that end, the IMAP server can be a Java™ application which comports with the J2EE™ specification. The IMAP server can be communicatively coupled to a data store of messages and can respond to requests to manage the messages through the collaborative messaging application. Additionally, access to the IMAP server can be regulated by authentication logic disposed within the application server.

Figure 1:
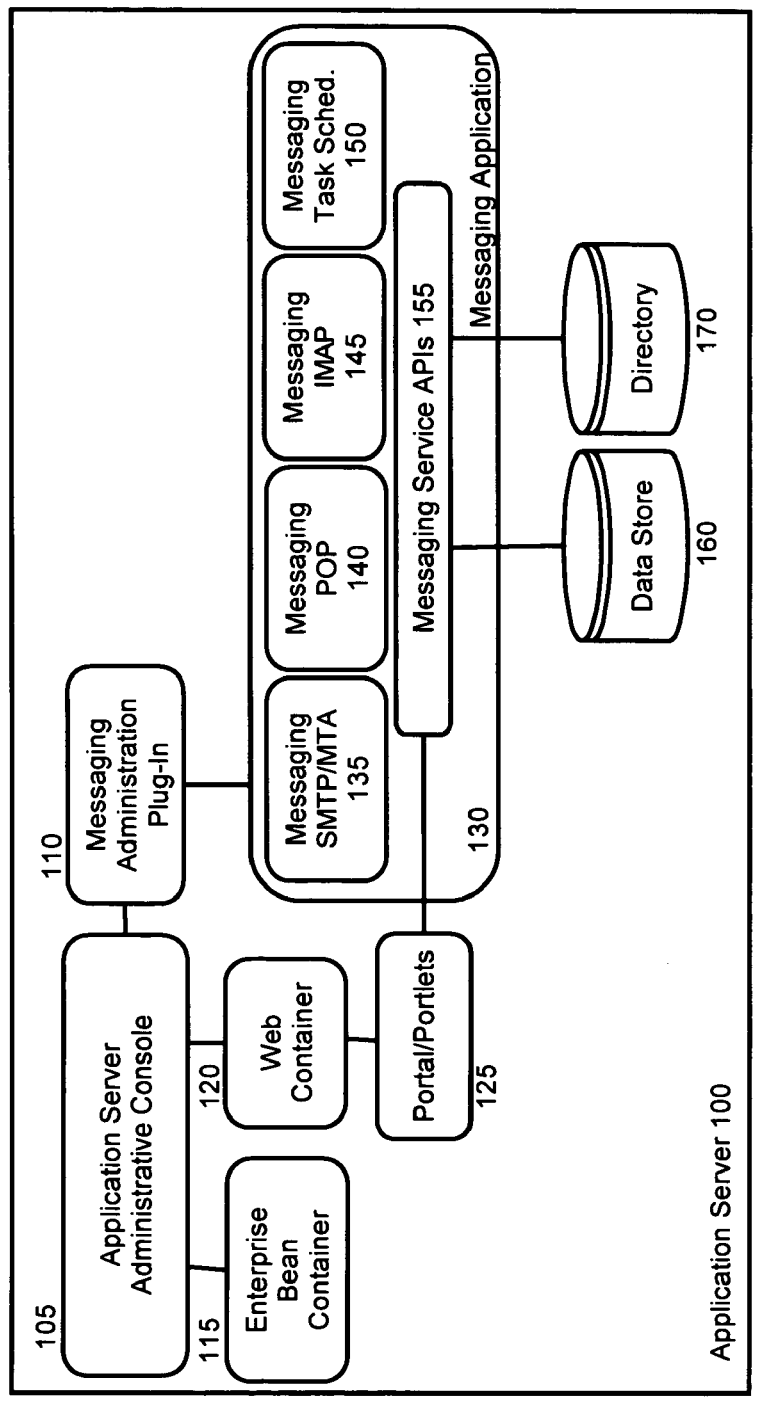
FIG. 1 is a block diagram of an application server hosting an IMAP server disposed within a collaborative messaging application in accordance with the present invention.

FIG. 1 is a block diagram of an application server 100 hosting an IMAP server 145 disposed within a collaborative messaging application 130 in accordance with the present invention. The application server 100 can include an enterprise bean container 115 in which enterprise beans can be disposed for use by client processes both internal and external to the application server 100. In this way, the application server 100 can support the deployment of business logic in a highly scalable, n-tier enterprise application.

The collaborative messaging application 130 can include a set of messaging service APIs 155 exposing the operation of both a POP server 140 and an IMAP server 145. Messages managed by the IMAP server 145 can be stored within a data store 160 and the messages can be managed and routed according to addressing and routing information disposed within the directory 170, for instance an LDAP compliant directory. Notably, the APIs 155 also can expose the operation of an SMTP message transfer agent 135 and a task scheduler 150. An user interface to the collaborative messaging application 130 can be provided to end users through a portal/portlet interface 125 disposed within a Web container 120. In this way, enterprise messaging can be extended even to those end users who lack access to a dedicated e-mail client.

The administrative console 105 of the application server 100 can be extended with a messaging administration plug-in 110 through which the collaborative messaging application 130 can be managed. Common management tasks which can be performed through the messaging administration plug-in 110 can include the configuration of a mail cell and mail servers, the establishment and maintenance of accounts, and the creation of policies for controlling user access to application features. The management tasks further can include the establishment of e-mail size quotas, the scheduling of administrative tasks, the establishment of filters to prevent the misuse of the messaging system and the configuration of the collaborative messaging application 130 for use with the directory 170.

Significantly, the IMAP server 145, in addition to the collaborative messaging application 130, can include a collection of platform independent classes such as those developed according to the Java language specification. More particularly, the IMAP protocol can be implemented in strict compliance with RFC 3501 using the Java programming language to comport with J2EE rather than a third-generation programming language in order to permit the seamless operation of the IMAP server 145 within the application server 100 of the present invention. By avoiding the use of a third generation language such as C or C++ in creating run-time object code for the IMAP server 145, the collaborative messaging application 130 can provide higher levels of availability than messaging applications developed using third generation languages. In particular, by using platform independent classes rather than a platform specific compiled object, destructive memory operations can be minimized such as the running over of defined memory boundaries.

Figure 2:
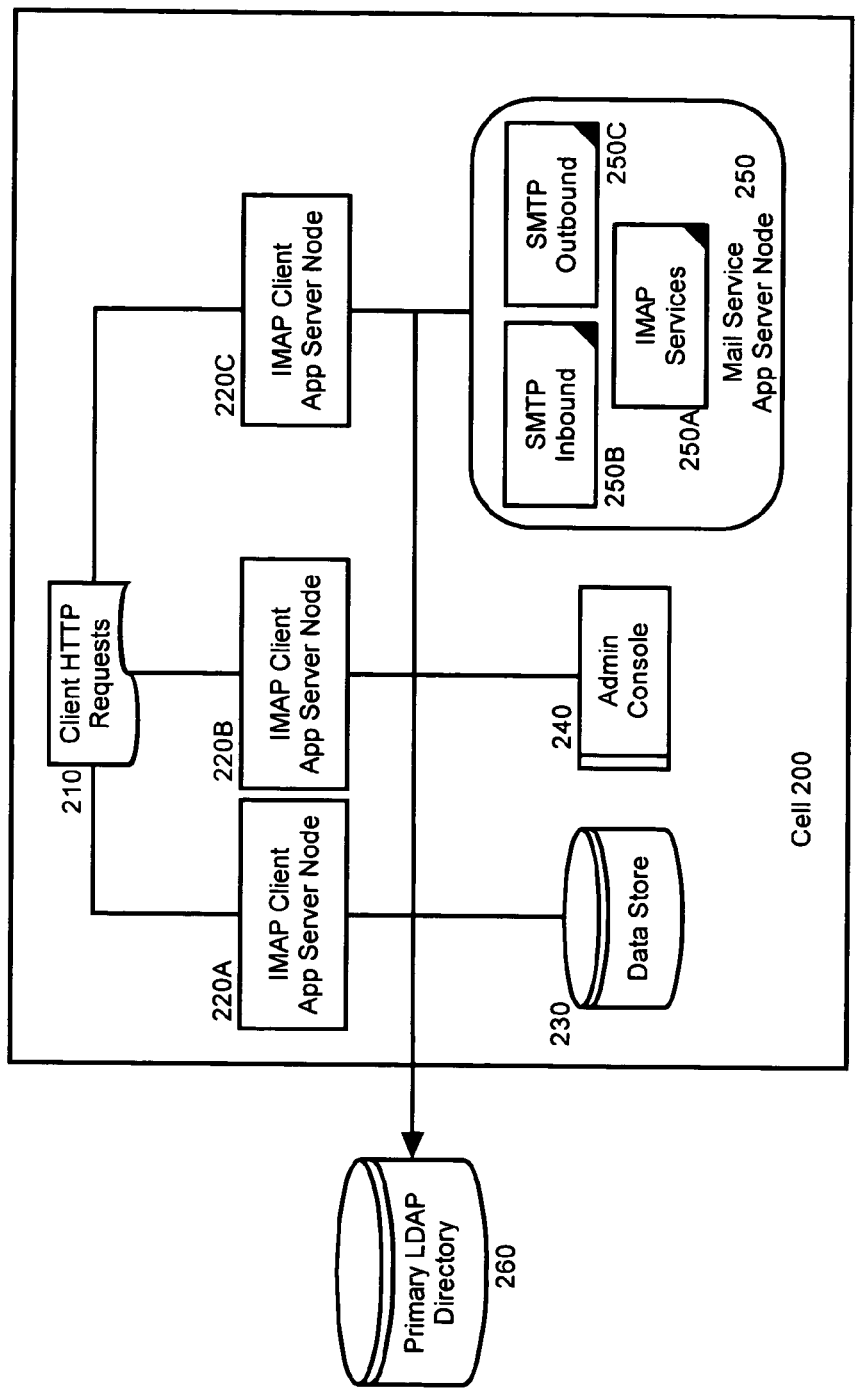
FIG. 2 is a schematic diagram of an mail server cell configured for processing messaging requests in the IMAP server of FIG. 1; and, FIG. 3 is a flow chart illustrating a process for handling messaging requests in the IMAP server of FIG. 1.

Importantly, the collaborative messaging application 130 can include an architecture substantially identical to that of the application server 100 itself. In this regard, the architecture of the collaborative messaging application 130 can include a logical grouping of application server nodes, mail servers and at least one associated data store. In more particular illustration, FIG. 2 is a schematic diagram of an mail server cell 200 configured for processing messaging requests in the IMAP server 145 of FIG. 1. Specifically, the mail cell 200 can include a set of IMAP client application server nodes 220A, 220B, 200C dedicated to serving a single data store 230 of messages.

A mail service application server node 250 further can be provided to process incoming and outgoing messaging requests 210 through the IMAP client application server nodes 220A, 220B, 220C. The mail service application server node 250 can include each of an SMTP inbound handler 250B and SMTP outbound handler 250C process coupled to a set of IMAP services 250 programmed in compliance with the IMAP protocol specification of RFC 3501. Optionally, the mail service application server node 250 also can include a set of POP services (not shown) to provide POP3 services to other POP3 client application server nodes (not shown) in the cell 200. Finally, an administrative console 240 can be provided through which the mail services of the cell 200 can be administered. As before, the entire cell 200 can be coupled to a primary LDAP directory 260 for addressing e-mail.

Figure 3:
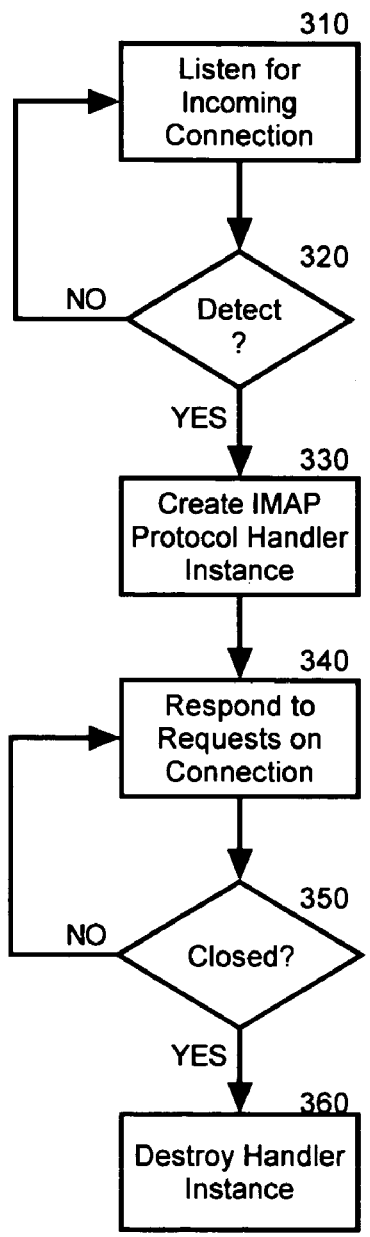

In operation, the IMAP server 145 of FIG. 1 once deployed in the application server 100 can manage incoming IMAP requests for IMAP messaging services in the collaborative messaging application 130. In more particular illustration, FIG. 3 is a flow chart illustrating a process for handling messaging requests in the IMAP server of FIG. 1. Beginning in block 310, the IMAP server can listen for an incoming connection. In decision block 320, when an incoming connection is detected, in block 330 an IMAP protocol handler instance can be created from a pre-configured IMAP protocol handler class.

Once the IMAP protocol handler instance has been created, in block 340 the instance can respond to client requests received over the connection. In this regard, the IMAP protocol handler class can be implemented as a state machine. The process can continue through decision block 350 until a request to close the connection is received. Once the connection has been closed, in block 360 the state machine can terminate and the instance of the IMAP protocol handler class can be destroyed in accordance with well-known principles in platform independent object-oriented programming.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. In a collaborative messaging system, a mail server cell comprising:
   a logical grouping of different application server nodes disposed and executing within an application server hosting an application programming interface to expose business logic and business processes for use by other applications, each of the different application server nodes hosting a different Internet Message Access Protocol (IMAP) compliant mail client and coupled to a single, different data store configured for storing electronic mail messages; and,
   an Internet Message Access Protocol (IMAP) compliant mail server executing in a computer and coupled to said logical grouping of application server nodes.

2. The mail server cell of claim 1, wherein said IMAP compliant mail server comprises a simple mail transfer protocol (SMTP) inbound request handler, an SMTP outbound request handler, and a set of IMAP services coupled to said SMTP inbound and outbound request handlers.

3. The mail server cell of claim 1, wherein said IMAP compliant mail server comprises a set of platform independent classes operable in a virtual machine environment.

4. The mail server cell of claim 1, wherein said virtual machine environment is the Java virtual machine environment.

5. The mail server cell of claim 4, wherein said IMAP compliant mail server comports with the J2EE specification.

6. The mail server cell of claim 1, further comprising a communicative coupling for each of the IMAP compliant mail clients to authentication services provided through said application server.

7. The mail server cell of claim 1, further comprising a communicative coupling to auto-provisioning services provided through the collaborative messaging system.

8. The mail server cell of claim 1, further comprising a communicative coupling to a portal/portlet interface to said IMAP compliant mail server.

9. A collaborative messaging application comprising:
   an Internet Message Access Protocol (IMAP) compliant mail server in a host computer and configured for operation and executing within an n-tier enterprise environment provided by an application server executing in memory of the host computer and hosting an application programming interface to expose business logic and business processes for use by other applications;

a plurality of application server nodes executing within the application server, each of the nodes hosting a different Internet Message Access Protocol (IMAP) compliant mail client and coupled to a single, different data store configured for storing electronic mail messages;

a markup language driven interface to said IMAP compliant mail server disposed within a Web container in said application server;

a data store configured to store messages process by said IMAP compliant mail server; and, a directory configured to provide configuration and addressing data to said IMAP compliant mail server.

10. The collaborative messaging application of claim 9, wherein said IMAP compliant mail server comprises a set of platform independent classes programmed for execution in a virtual machine and specifically operable in said n-tier enterprise environment.

11. The collaborative messaging application of claim 10, wherein said virtual machine is a Java virtual machine and wherein said n-tier enterprise environment is J2EE.

12. The collaborative messaging application of claim 9, further comprising an administrative console coupled to a messaging administrative plug-in to said console facilitate management of said IMAP compliant mail server, said markup language driven interface, said data store and said directory.

13. The collaborative messaging application of claim 9, further comprising authentication logic disposed within said application server and communicatively linked to said IMAP compliant mail server for use by said IMAP compliant mail server.

14. The collaborative messaging application of claim 9, further comprising auto-provisioning logic disposed within the collaborative messaging application and communicatively linked to said IMAP compliant mail server for use by said IMAP compliant mail server.

* * * * *